United States Patent
Surwade (10) Patent No.: US 11,208,567 B2
(45) Date of Patent: Dec. 28, 2021

(54) EMERALDINE BASE COMPOSITE FOR CORROSION INHIBITION

(71) Applicant: SAS Nanotechnologies LLC, Newark, DE (US)

(72) Inventor: Sumedh P. Surwade, Newark, DE (US)

(73) Assignee: SAS Nanotechnologies LLC, Newark, DE (US)

(*) Notice: Subject to any disclaimer, the term of this patent is extended or adjusted under 35 U.S.C. 154(b) by 51 days.

(21) Appl. No.: 16/009,821

(22) Filed: Jun. 15, 2018

(65) Prior Publication Data
US 2018/0362777 A1 Dec. 20, 2018

Related U.S. Application Data

(60) Provisional application No. 62/520,776, filed on Jun. 16, 2017.

(51) Int. Cl.
- *C09D 5/08* (2006.01)
- *C09D 5/02* (2006.01)
- *C09D 133/06* (2006.01)
- *C09D 163/00* (2006.01)

(52) U.S. Cl.
CPC ............ *C09D 5/084* (2013.01); *C09D 5/027* (2013.01); *C09D 5/028* (2013.01); *C09D 5/082* (2013.01); *C09D 5/086* (2013.01); *C09D 163/00* (2013.01); *C09D 133/06* (2013.01)

(58) Field of Classification Search
None
See application file for complete search history.

(56) References Cited

U.S. PATENT DOCUMENTS

| 5,972,518 A | 10/1999 | Epstein et al. |
|---|---|---|
| 9,611,396 B2 | 4/2017 | Wang et al. |
| 2004/0005464 A1* | 1/2004 | Ha .................. C09D 5/082 428/413 |
| 2012/0187344 A1 | 7/2012 | Diggroc et al. |

(Continued)

FOREIGN PATENT DOCUMENTS

| CN | 101443421 A | 5/2009 |
|---|---|---|
| CN | 103205150 | 7/2013 |
| WO | 0188047 A1 | 11/2001 |

OTHER PUBLICATIONS

Tallman, et al., Conducting polymers and corrosion: polyaniline on steel, Corrosion, 1999, vol. 55, No. 8, pp. 779-786.

(Continued)

*Primary Examiner* — Joseph D Anthony
(74) *Attorney, Agent, or Firm* — BakerHostetler (57) ABSTRACT

The present invention relates to an emeraldine base composite, its preparation, and use as an effective anticorrosive pigment additive for corrosion inhibition. The emeraldine base composite comprises an insulating form of polyaniline or its derivatives adhered to an inorganic or organic material substrate such that the emeraldine base covers from about 1-100% surface of the material. Inter alia, the emeraldine base composite can be added to a coating as an anticorrosive pigment additive that inhibits corrosion and as a filler material that increases strength and barrier properties of coating.

16 Claims, 6 Drawing Sheets

(56) References Cited

U.S. PATENT DOCUMENTS

2014/0134423 A1* 5/2014 Wang ................ C08G 73/0266
428/306.6

OTHER PUBLICATIONS

Sathiyanarayanan,, et al., Preparation of polyaniline-TiO2 composite and its comparative corrosion protection performance with polyaniline; Synthetic Metals 157, 2007, 205-213.

Cook, et al., On the Mechanism of Corrosion Protection of Mild Steel with Polyaniline, Journal of The Electrochemical Society, 151, 2004, B529-B535.

* cited by examiner

EMERALDINE BASE COMPOSITE FOR CORROSION INHIBITION

CROSS REFERENCE TO RELATED APPLICATION

This application claims the benefit of U.S. Provisional Application No. 62/520,776 filed Jun. 16, 2017, the entirety of which is incorporated by reference herein for any and all purposes.

FIELD OF THE INVENTION

The present invention relates to preparing and using an insulating form of polyaniline or its derivatives, also known as the emeraldine base, deposited on to an inorganic or organic base material to form a composite. The emeraldine base composite, added to a coating applied on to a metal substrate, at least inhibits corrosion and/or acts as filler material that increases strength and barrier properties of the coating layer on the metal surface.

BACKGROUND

Repairing or replacing corroded metallic structures wastes billions of dollars every year. Applying a polymer coating on the metal surface inhibits corrosion to some extent. The polymer coating acts as a dense, physical barrier to the corrosive species, preventing them from reaching the metal surface and consequently protecting metal structure from corrosion. A mere polymer coating, however, is not sufficient to prevent corrosion, especially if the surface is scratched or abraded, a likely scenario for all metal structures in use. Thus, in the last few decades, metal-based pigments have been introduced as additives into coatings, which significantly increase the coating efficiency and protect the metal surface from corrosion even in case of scratches and abrasions.

Due to ecological, environmental and regulatory concern, however, call for the use of metal-free anticorrosive coatings is steadily increasing. Considering the metal-free anticorrosive coating development, use of conducting polymer polyaniline, polyaniline derivatives, and oligomers of aniline (referred to as polyaniline from hereon) is touted as an effective alternative to metal pigments used in coatings.

Polyaniline and Dopant-Release Problem

Generally, conducting polyaniline is used for metal corrosion protection. Several methods are used that apply conducting polyaniline onto the metal surface to prevent corrosion. However, because the conducting form of polyaniline is difficult to process—due to its insoluble/infusible nature—conducting polyaniline is doped with a polymeric dopant such as lignin sulfonic acid or polystyrene sulfonic acid that induces dispersibility characteristic into polyaniline making it dispersible in aqueous and organic systems. But the doped form of polyaniline tends to release the dopant over time. The released dopant causes internal stress in coatings, which, in turn, weakens the coating and reduces its life.

Even with conducting polyaniline-inorganic material composite, for example, conductive polyaniline-$TiO_2$ (Venkatachari, et al. Synthetic Metals, 157, 2007), the composite tends to lose the dopant ion, consequently weakening the coating over time instead of strengthening it.

Non-Contiguous Film Formation

In another art, conducting polyaniline composite with a variety of inorganic and polymeric materials such as $TiO_2$, talc, nylon, epoxy, etc., is used as corrosion-inhibiting additive in coatings (U.S. Pat. No. 9,611,396). The composite consists of a conducting polymer forming a non-contiguous film on the materials surface, i.e., the conducting polymer, necessarily, does not cover the base material surface completely.

In one embodiment, the present invention differs from the above two approaches. The composite of the present invention uses the insulating form of the polyaniline polymer. Therefore, it altogether eschews the dopant-release problem. Also, the polymer in the present invention necessarily covers the material surface completely, forming a core-shell type structure, the full coverage simply improves the efficiency of the composite in providing the corrosion-inhibiting additive.

SUMMARY OF THE INVENTION

Insulating Form of Polyaniline

In one embodiment, the present invention relates to the use of an emeraldine base composite as an effective anticorrosive pigment additive for corrosion inhibition. The emeraldine base composite is a composite of polyaniline or its derivatives in the insulating form and inorganic or organic materials such that the emeraldine base covers the entire surface of the material forming a core-shell type structure.

In another embodiment, this invention relates to an emeraldine base composite when dispersed in a resin.

In another embodiment, the present disclosure relates to a method of preparing emeraldine base composite by addition of the inorganic or organic material to an acidic suspension containing monomer, polymerizing monomer using an oxidant on the surface of the inorganic or organic material, followed by subsequent filtering and redispersing and stirring the material in basic solution to obtain emeraldine base composite.

In a further embodiment, the present disclosure relates to preparing stable aqueous dispersion of emeraldine base composite that can be added as an anticorrosive pigment additive and filler material directly into resin during the grinding and let down stage.

In a further embodiment, the present disclosure relates to dispersion of emeraldine base composite into a resin matrix. The emeraldine base composite has multiple functions in coatings. For example, it not only acts as an anticorrosive pigment additive that inhibits corrosion but also acts as a filler material increasing strength and barrier properties of the coating. The emeraldine base composite is dispersed into resin matrix by adding emeraldine base composite powder under high-speed dispersion during the grinding stage or adding emeraldine base dispersion directly into resin during grinding or letdown stage.

The composite when added 2-50% to a coating shows superior corrosion resistance properties when compared to the coatings containing other filler materials.

This invention also relates to an emeraldine base composite, said emeraldine base composite comprising:

(a) an emeraldine base, wherein said emeraldine base is substituted or unsubstituted polyaniline; and (b) at least one base material, wherein said emeraldine base covers the entire surface of said at least one base material, and wherein the weight of said emeraldine base as percent of said emeraldine base composite is in the range of from about 0.1% to about 50%.

In one embodiment, this invention relates to the above-described emeraldine base composite, wherein said substituted or unsubstituted polyaniline has a base structure of:
wherein R is independently selected from a group consisting of H, substituted or unsubstituted $C_1$-$C_6$ alkyl, and substituted or unsubstituted $C_1$-$C_6$ alkoxy.

In another embodiment, this invention relates to the above described emeraldine base composite, wherein said at least one base material is an inorganic material or an organic material.

In yet another embodiment, this invention relates to the above described emeraldine base composite, wherein said inorganic base material is selected from the group consisting of talc, $TiO_2$, mica, kaopaque, clay, kaolin, barium sulfate, alumina, silica, zeolite, alumina-silica, calcium borosilicate, phosphosilicates, molybdate pigments, barium metaborate, zinc phosphate, quartz, montmorillonite, mixtures thereof, and combinations thereof.

In yet another embodiment, this invention relates to the above described emeraldine base composite, wherein said organic base material is selected from the group consisting of synthetic rubber, phenol-formaldehyde resin, neoprene, nylon, polyvinyl chloride, polystyrene, polyethylene, polypropylene, polyacrylonitrile, PVB, silicone, combinations thereof, and mixtures thereof.

In one embodiment, this invention relates to a corrosion-inhibiting additive comprising the emeraldine base composite as recited above.

In one embodiment, this invention relates to an aqueous dispersion, comprising:
(a) the emeraldine base composite as recited above, or the corrosion-inhibiting additive as recited in above;
(b) a wetting agent and/or a dispersing agent; and
(c) water.

In yet another embodiment, this invention relates to an anti-corrosive coating composition comprising the emeraldine base composite recited above, or the corrosion-inhibiting additive as recited above.

This invention also relates the anti-corrosive coating composition as recited above, wherein said anti-corrosive coating composition is aqueous-based or solvent-based.

In yet another embodiment, this invention relates to an anti-corrosive coating composition described above, wherein the emeraldine base composite is added to the coating as powder during the grinding or let-down stage or as aqueous dispersion during the grinding or let down stage.

In another embodiment, this invention relates to a process for making an emeraldine base composite comprising:
(1) providing an emeraldine base monomer;
(2) providing at least one base material;
(3) contacting said emeraldine base monomer with said base material;
(4) polymerizing said emeraldine base monomer on said base material; and
(5) de-doping the polymer of said emeraldine base resulting in the previous step, to form a contiguous or a non-contiguous coating of insulated form of polyaniline on said base material to form the emeraldine base composite.

In another embodiment, this invention relates to a process for preparing an anticorrosive coating composition, comprising:
(1) providing a coating composition;
(2) providing an emeraldine base composite; and
(3) mixing said emeraldine base composite with said coating composition.

In yet another embodiment, this invention relates to the process as recited as recited, wherein said emeraldine base composite is mixed in powder form with said coating composition.

In another embodiment, this invention also relates to the process as recited above, wherein said emeraldine base composite is mixed as an aqueous dispersion with said coating composition.

Insulating Form and Conducting Form of Polyaniline

In one embodiment, this invention also relates to a composite particle comprising:
(a) an emeraldine base;
(b) a doped conducting polyaniline; and
(c) at least one base material, wherein said emeraldine base and said doped conducting polyaniline covers from about 1-100% of the surface of said at least one base material, and wherein the weight of said emeraldine base and said doped conducting polyaniline as percent of said composite is in the range of from about 0.1% to about 50%.

In another embodiment, this invention relates to the composite particle described above, wherein said at least one base material is an inorganic material or an organic material;
wherein said inorganic base material is selected from the group consisting of talc, $TiO_2$, mica, kaopaque, clay, kaolin, barium sulfate, alumina, silica, zeolite, alumina-silica, calcium borosilicate, phosphosilicates, molybdate pigments, barium metaborate, zinc phosphate, quartz, montmorillonite, mixtures thereof, and combinations thereof; and
wherein said organic base material is selected from the group consisting of synthetic rubber, phenol-formaldehyde resin, neoprene, nylon, polyvinyl chloride, polystyrene, polyethylene, polypropylene, polyacrylonitrile, PVB, silicone, combinations thereof, and mixtures thereof.

In yet another embodiment, this invention relates to a corrosion-inhibiting additive comprising the composite particle as recited above.

This invention also relates to an aqueous dispersion, comprising:
(a) a corrosion-inhibiting additive comprising the composite particle as recited above;
(b) a wetting agent and/or a dispersing agent; and
(c) water.

This invention further relates to an anti-corrosive coating composition comprising the corrosion-inhibiting additive as recited above.

In one embodiment, this invention relates to the anti-corrosive coating composition described above, wherein said anti-corrosive coating composition is aqueous-based or solvent-based.

In another embodiment, this invention relates to the anti-corrosive coating composition recited above, wherein the composite particle is added to the coating as powder during the grinding or let-down stage or as aqueous dispersion during the grinding or let down stage.

In yet another embodiment, this invention relates to a process for making an composite particle of recited above, comprising:

(1) providing the monomer of the emeraldine base and doped conducting polyaniline;
(2) providing at least one base material;
(3) contacting said monomer of emeraldine base and said doped conducting polyaniline with said base material;
(4) polymerizing the monomer of said emeraldine base and said doped conducting polyaniline on said base material; and
(5) de-doping said emeraldine base to form a contiguous or non-contiguous coating of insulated form of polyaniline and doped polyaniline on said base material to form the composite particle.

In a further embodiment, this invention relates to a process for preparing an anticorrosive coating composition, comprising:

(1) providing a coating composition;
(2) providing an emeraldine base composite; and
(3) mixing said emeraldine base composite with said coating composition.

DETAILED DESCRIPTION OF THE INVENTION

By "polyaniline" is meant the polymer polyaniline, polyaniline derivatives, and oligomers of aniline.

In this disclosure, "insulating form of polyaniline" and "emeraldine base" are used interchangeably. Thus, by "insulating form of polyaniline" is meant the polyaniline in its emeraldine base form. In the "emeraldine base" context, the term "base" is meant to convey the basic nature of the emeraldine, as opposed to its salt form. "Base," in the "emeraldine" context does not mean a support or an underlying structure that provides support.

Generally speaking, the insulating form of polyaniline can be defined as polyaniline with low electrical conductivity, with nominal to no charge species/ions on the polymer backbone. In one embodiment, the fully insulating form of polyaniline have electrically conductivity below 0.00001 S/cm, whereas conducting form of polyaniline is electrically conducting with conductivities in the range of 0.00001 S/cm-1000 S/cm. Considering the chemical structure, conducting form of polyaniline has radical cationic charges on its conjugated polymer backbone and are stabilized by anionic counter-ions such that the charge ions can move along the conjugated polymer backbone. On the other hand, the insulating form of polyaniline have a non-conjugated backbone and is free of any charged moieties.

This invention relates to an emeraldine base composite, which comprises the emeraldine base and a base material. The emeraldine base composite serves multiple functions in coatings and paints on corrosion susceptible surfaces. For example, it not only acts as an anti-corrosive pigment additive that inhibits corrosion, but also as a filler material that increases the strength and barrier properties of the coating to which it is added. The emeraldine base composite when added from about 2-50% to a coating shows superior corrosion resistance properties when compared to the coatings containing other filler materials.

In one embodiment, the emeraldine base composite described herein is a composite of polyaniline or its derivatives in the insulating form and an inorganic or organic base material, such that the emeraldine base covers the entire surface of the base material, essentially forming a core-shell type structure.

In another embodiment, the emeraldine base composite described herein is a composite of polyaniline or its derivatives in the insulating form and an inorganic or organic base material, such that the emeraldine base only partially covers the surface of the base material, essentially forming discrete deposits of emeraldine base particles on the base material. The polyaniline and its derivatives in the emeraldine base form may be substituted or unsubstituted polyaniline. The aniline monomer used to make substituted or unsubstituted polyaniline has structure of the formula below, wherein R is H, $C_1$-$C_6$ alkyl, or $C_1$-$C_6$ alkoxy:

The filler base material is any known filler materials used in coatings such as silica bead, organic or inorganic pigments, inorganic or organic solids, or combinations thereof. The term "base" used in the context of a "base material" means a support or the underlying structure and not as "base" as different from an "acid." For example, in this invention the insulating form of polyaniline is polymerized or deposited or coated on the "base material," wherein the base material is titanium dioxide. For example, $TiO_2$ is generally used as a filler in coating. In this invention, this filler material, i.e. $TiO_2$, is used as a base material on which the insulating form of the polyaniline is deposited.

Suitable inorganic base materials include aluminas, silicas, alumina-silicas, zeolites, talc, barium sulfate, titanium dioxide, mica, calcium borosilicate, phosphosilicates, molybdate pigments, barium metaborate, zinc phosphate, quartz, montmorillonite, mixtures thereof, and combinations thereof. Suitable organic/polymer substrate include synthetic rubber, phenol-formaldehyde resin, neoprene, nylon, polyvinyl chloride (PVC or vinyl), polystyrene, polyethylene, polypropylene, polyacrylonitrile, PVB, silicone, combinations thereof, and mixtures thereof.

The base material may be any suitable base material known to one skilled in the art. The base material may also be substantially insoluble in an aqueous or semi-aqueous solution, and stable in a dilute acidic solution. The base material should be able to remain insoluble during preparation in the polymerization solution (e.g. a dilute acidic aqueous or semi-aqueous solution). In one embodiment, the base material is water insoluble. Suitable inorganic solids for use as a base material include aluminas, silicas, alumina-silicas, zeolites, etc. Suitable organic/polymer solids for use as a base material include synthetic rubber, phenol formaldehyde resin (or Bakelite®), neoprene, nylon, polyvinyl chloride (PVC or vinyl), polystyrene, polyethylene, polypropylene, polyacrylonitrile, PVB, silicone, DER™680-20, cation exchange resin C-249, Nylon resin, 2GT, 3GT, 4GT and such polyesters, etc. Suitable pigments for use as a base material include talc, barium sulfate, titanium dioxide, mica, calcium borosilicate, phosphosilicates, molybdate pigments, barium metaborate, zinc phosphate, etc.

In another embodiment, the base is acid resistant. In a further embodiment, the base is oxidant resistant. For example, the base does not substantially degrade in the presence of an oxidant, such as ammonium persulfate.

The base material may also be a porous solid. The insulating form of the polyaniline at least partially coat inside a pore on the porous base material. The surface area of a base material includes its geometric surface area and the area of its pore wall. The pore diameter may be small to limit the aggregation of the polymer when monomer polymerizes inside the pores. The total pore value of a porous solid is V ($cm^3/g$), the specific surface area is S ($m^2/g$), and the average pore diameter is R. R can be estimated as R=2V/S. For example, a porous solid with a total pore value of about 0.3 $cm^3/g$ (V~0.3 $cm^3/g$) and a specific surface area of about 5 $m^2/g$ (S~5 $m^2/g$) has an average pore diameter of about 120 nm. For a porous solid with a surface area as low as 1 $m^2/g$, the average pore diameter is 600 nm.

Preferably, the porous base material of the present disclosure may have a total pore value of about 0.05 $cm^3/g$ to about 0.80 $cm^3/g$. More preferably, the total pore value may be about 0.1 $cm^3/g$ to about 0.50 $cm^3/g$. The porous solid may also have a preferred specific surface area of about 0.5 $m^2/g$ to about 1,200 $m^2/g$. More preferably, the preferred specific surface area may be about 0.5 $m^2/g$ to about 50 $m^2/g$. Finally, the porous solid of the present disclosure may have an average pore size of about 5 nm to about 5,000 nm, and more preferably about 50 nm to about 2,000 nm.

Porosity or void fraction is a measure of the void (i.e., "empty") spaces in a material, and is a fraction of the volume of voids over the total volume, between 0-1, or as a percentage between 0-100%. Porous base materials of the present disclosure may have a porosity between about 5% to about 70%, and preferably between about 10% and about 50%.

The average particle size of the base material is preferably smaller than about 80 mesh. Base material may be screened to remove bigger particles by passing the particles through an about 80 to 100 mesh sieve. In one embodiment, the average diameter of the base material is between about 250 nm and about 5,000 nm. Preferably, the average diameter of the base particles is between about 450 nm and about 3,000 nm. More preferably, the average diameter of the base particles is between about 500 nm and about 2,000 nm.

The base material may also be a solid with a non-smooth surface. With regard to a porous solid or solid with a non-smooth surface, the emeraldine base polymer may be contained in or on the surface of the base. The conducting polymer may be contained on the surface and inside, or partially inside, the porous solid or non-smooth surface.

The base material have local areas where monomers of the emeraldine base polymer are present when the base material is wetted with a solution having such monomers. The amount of polyaniline emeraldine base in the composite may vary depending on the base material and the application or article for use with. In one embodiment, the weight percent of the insulating form of the polyaniline, also known as the emeraldine base in the composite is between about 0.1% and about 50%. Stated another way, the weight percent of the emeraldine base in the composite is any one of the numbers selected from the following numbers in percentage weight:

0.1; 0.2; 0.3; 0.4; 0.5; 0.6; 0.7; 0.8; 0.9; 1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 41; 42; 43; 44; 45; 46; 47; 48i; 49; and 50.

In another embodiment, the weight percent of the emeraldine base in the composite is within the range defined by any two numbers from the above list, including the endpoints of the range.

Preferably, the weight percent of polyaniline emeraldine base in the composite is between about 0.5% and about 25%. Stated another way, the weight percent of the emeraldine base in the composite is any one of the numbers selected from the following numbers in percentage weight:

0.5; 0.6; 0.7; 0.8; 0.9; 1; 2; 3; 4; 5; 6; 7; 8; 9; 10; 11; 12; 13; 1.4; 1.5; 1.6; 1.7; 1.8; 1.9; 20; 21; 22; 23; 24; and 25.

In another embodiment, the weight percent of the emeraldine base in the composite is within the range defined by any two numbers from the above list including the endpoints of the range.

Further preferably, the weight percent of insulating form of polyaniline, that is, emeraldine base in the composite is between about 1% and about 1.5%. Stated another way, the weight percent of the emeraldine base in the composite is any one of the numbers selected from the following numbers in percentage weight:

1; 2; 3; 4; 5; 6; 7; 8; 9; 10; 11; 1.2; 1.3; 1.4; and 15.

In another embodiment, the weight percent of the emeraldine base in the composite is within the range defined by any two numbers from the above list, including the endpoints of the range.

In one embodiment, this invention relates to using only an insulating form of polyaniline. In another embodiment, this invention relates to using the insulating form of polyaniline, wherein the insulating form of polyaniline is present substantially compared to the doped conducting form of polyaniline. The insulating form of the polyaniline is present is at least 25% of the total weight of the insulating form of polyaniline and the doped conducting form polyaniline if the doped conducting form is present. Stated another way, the insulating form of polyaniline is present in weight percent represented by one of the following numbers:

25; 26; 27; 28; 29; 30; 31; 32; 33; 34; 35; 36; 37; 38; 39; 40; 41; 42; 43; 44; 45; 46; 47; 48; 49; 50; 51; 52; 53; 54; 55; 56 5;7 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88 89; 90; 91; 92; 93; 94; 95; 96; 97; 98; 99; and 100.

In another embodiment of the invention, the weight percent of the insulating form of polyaniline is within a range including the endpoints defined by any two number selected from the above list.

In one embodiment, the base material surface is fully covered (100%) by the insulating form of the polyaniline. In another embodiment, the base material surface is partially covered (1-99%) by the insulating form of the polyaniline. Stated another way, the insulating form of polyaniline covers the percent surface area of the base material represented by one of the following numbers:

1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 41; 42; 43; 44; 45; 46; 47; 48; 49; 50; 51; 52; 53; 54; 55; 56 5;7 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88 89; 90; 91; 92; 93; 94; 95; 96; 97; 98; and 99.

In another embodiment of the invention, the insulating form of polyaniline covers the percent surface area of the base material within a range including the endpoints defined by any two number selected from the above list.

Mechanism of Corrosion Inhibition by Emeraldine Base

While not wishing to be bound by theory herein, the conducting and insulating form of polyaniline prevent corrosion by a different mechanism.

Emeraldine Salt: Polyaniline conducting form

Emeraldine Base: Insulating form of Polyaniline

The conducting form of polyaniline does not prevent corrosion by passivation mechanism. At the onset of corrosion, conducting polyaniline is reduced to its reduced oxidation state (leucomeraldine) and the dopant anions are released that form a protective layer on the surface of corroding steel, preventing corrosive ions from reaching the surface, thus significantly slowing down the rate of corrosion. (Laycock et al., J. Electrochem. Soc. 151, B529, 2004). Thus, depending on the dopant ions, phosphoric, sulfonic etc., the rate of corrosion will vary. In case of scratch, the dopant anions released at the defect edges inhibit the cathodic reaction and slow down the rate at which hydroxy ions are produced, consequently decreasing the rate of corrosion.

However, since corrosion prevention using conducting form of polyaniline is dopant-ion dependent, if the dopant has no affinity for steel or the dopant ions are lost/released during the storage or due to weather conditions, the corrosion inhibition effectiveness will decrease markedly.

Emeraldine base prevents corrosion of steel by passivation mechanism. Emeraldine base promotes formation of an oxide layer on the steel surface, which prevents corrosive ions reaching the surface of steel, consequently preventing corrosion.

Epstein, et al., in U.S. Pat. No. 5,972,518 explain the passivation mechanism. All steel surfaces have thin $Fe_3O_4$ oxide layer (~35° A) and a top $Fe_2O_3$ layer (~15° A). The steel corrodes at the $Fe_3O_4$/metal interface by diffusion of water molecules through 1 nm diameter pores that exist across the oxide layer where $Fe_3O_4$ is formed. The oxide formation induces the creation of $Fe^{2+}$ ions from the metal that diffuse up through the oxide along grain boundary. At the $Fe_2O_3/Fe_3O_4$ interface, $Fe^{2+}$ ions will react with $O^{2-}$ ions that diffused through $Fe_2O_3$ forming predominantly $Fe_3O_4$. The current is balanced either by electrons diffusing up through the films or $H^+$ down through the films. When the emeraldine base is in contact with the steel, by donating electrons into the LUMO (quinoid) level of the emeraldine base, a positive charge is initially formed on the steel surface. Since $Fe_3O_4$ layer on steel surface is semi-metallic and $Fe_2O_3$ is a semi-conductor, a charged layer will be built up at the $Fe_3O_4/Fe_2O_3$ interface instead of $Fe_3O_4$/Fe contact. The electronic structure of the Fe3O4 oxide in this region will be stabilized due to electron deficiency, changing the chemical potential. This, in turn, will make it harder to further oxidize the iron ions, and thus the steel sample becomes more resistant to corrosion. The charged layer at the $Fe_2O_3/Fe_3O_4$ interface will also hinder diffusion of $Fe^{2+}$ ions up through the bulk to the interface and $O^{2-}$ ions from the surface down to the interface, which also reduces the rate of corrosion.

Preparation of the Composite

This invention also relates to method of preparing the polyaniline emeraldine base composite. In one embodiment, the composite is prepared by immersing a filler base material, in particulate form, in an acidic aniline monomer solution and initiating polymerization. Monomers that are adsorbed on the base-material particle-surface or are in the solution close to the surface may polymerize and precipitate on the surface of base material acting as filler. The pH of the acidic aniline solution may be less than about 4. The acidic pH may be obtained using any acid including inorganic or organic acids, such as phosphoric acid, hydrochloric acid, sulphuric acid, nitric acid, acetic acid, and organic sulphonic acids such as para-toluene sulphonic acid, dodecalbenzene sulphonic acid, methane sulphonic acid, benzene sulphonic acid.

In one embodiment, more than one base material is used for preparing the emeraldine base composite.

Polymerization of the emeraldine base aniline monomer may be initiated by any means known to one skilled in the art. For example, in one embodiment, polymerization may be initiated by oxidation. Suitable oxidizing agents include ammonium peroxydisulfate, potassium dichromate, potassium iodate, ferric chloride, potassium permanganate, potassium bromate, and potassium chlorate.

In one embodiment, the emeraldine base is dissolved in a solvent. A base material is added to the solution. This allows for adsorption of the solution on the base material. The solvent is then evaporated to produce a base material coated with a layer of the emeraldine base. Solvents include chloroform, dimethyl sulfoxide, n-methyl pyrrolidone, methylene chloride, trichloromethane, acetone, and the like.

It should be noted that the base material used in the present invention can be of regular shape or irregular shape or a mixture of the two.

Anti-Corrosive Coatings

In one embodiment, the insulating form of polyaniline emeraldine base composite whether partially or fully covering the base material, is used as an additive in an anticorrosive coating.

Unextracted metal usually exists in its stable oxidized state as an ore. Extracted metal has a tendency to react with its environment and form a corresponding oxide. This process of oxide formation leads to deterioration and is called corrosion. Certain conditions, such as the existence of aggressive anions, can accelerate corrosion. Chloride and sulfate ions are two of the more aggressive anions and their presence will accelerate the corrosion of metal when contacted with a metal surface.

The use of an organic coating on a metal substrate is one of the most important approaches to reduce corrosion. Such organic coatings often contain an anticorrosive additive to improve corrosion protection. An anticorrosion coating system usually consists of multiple coating layers including a primer layer, one or more inter layer(s), and a topcoat layer. The insulating form of polyaniline emeraldine base composite may be used in one or all of the layers, for e.g., in primer, interlayer and topcoat. This invention also relates to the process of coating an anticorrosive coating on a metal substrate, wherein said anticorrosive coating comprises the emerald base composite that comprises the insulating form of polyaniline emerald base form deposited on the base material.

Anticorrosive coatings having insulating form of polyaniline emeraldine base composite may be able to prevent oxygen, water, and aggressive anions in the environment from arriving at or near, or contacting, the substrate metal surface and degrading or corroding the metal. Also, the polyaniline emeraldine base may be able to passivate the metal surface preventing its corrosion.

The substrate to be protected may be any metal or metal containing material or composite that is subject to corrosion, particularly by aggressive anions. The substrate may include steel, galvanized steel, aluminum, aluminum alloys, zinc, zinc alloys, magnesium, and magnesium alloys.

The anticorrosive coating layers, primer, interlayer, or topcoat, may have variable amounts of insulating form of polyaniline emeraldine base composite depending on the type of polymer, base material, substrate, application, or article for use therewith.

In one embodiment, preferably, the weight percent of polyaniline emeraldine base composite in the primer layer is about 0.05% to about 50%. Stated another way, the weight percent of polyaniline emeraldine base composite in the primer layer is any one of the numbers selected from the following numbers in percentage weight:

0.05; 0.1; 0.2; 0.3; 0.4; 0.5; 0.6; 0.7; 0.8; 0.9; 1; 2; 3; 4; 5; 6; 7; 8; 9; 1.0; 11; 12; 13; 1.4; 15; 16; 17; 18; 19; 20; 21; 22; 23; 24; 25; 26; 27; 28; 29; 30; 31; 32; 33; 34; 35; 36; 37; 38; 39; 40; 41; 42; 43; 44; 45; 46; 47; 48i; 49; and 50.

In another embodiment, the weight percent of the polyaniline emeraldine base composite in the primer layer is within the range defined by any two numbers from the above list, including the endpoints of the range.

More preferably, the weight percent of polyaniline emeraldine base composite in the primer layer is about 0.5% to about 25%. Stated another way, the weight percent of polyaniline emeraldine base composite in the primer layer is any one of the numbers selected from the following numbers in percentage weight:

0.5; 0.6; 0.7; 0.8; 0.9; 1; 2; 3; 4; 5; 6; 7; 8; 9; 10; 11; 12; 13; 14; 15; 16; 17; 18; 19; 20; 21; 22; 23; 24 and 25.

In another embodiment, the weight percent of the polyaniline emeraldine base composite in the primer layer is within the range defined by any two numbers from the above list, including the endpoints of the range.

Similarly, in one embodiment of the present invention, the insulating form of the polyaniline emeraldine base composite is added to the interlayer or to the topcoat of a coating layer.

In one embodiment, the coating materials comprising said insulating form of polyaniline emeraldine base composite that may be applied to form a coating having an average thickness from about 2.5 μm to about 160 μm. Stated another way, the thickness of the coating layer is any one of the numbers selected from the following numbers in micron units:

2.5; 2.6; 2.7; 2.8; 2.9; 3; 5; 10; 20; 30; 40; 50; 60; 70; 80; 90; 100; 110; 120; 130; 140; 150; and 160.

In another embodiment, the thickness of coating layer comprising the polyaniline emeraldine base composite is within the range defined by any two numbers from the above list, including the endpoints of the range.

In one embodiment, the coating materials comprising said insulating form of polyaniline emeraldine base composite that may be applied to form a coating having an average thickness from about 5 μm to about 80 μm. Stated another way, the thickness of the coating layer is any one of the numbers selected from the following numbers in micron units:

5; 10; 15; 20; 25; 30; 35; 40; 45; 50; 55; 60; 65; 70; 75; and 80.

In another embodiment, the thickness of coating layer comprising the polyaniline emeraldine base composite is within the range defined by any two numbers from the above list, including the endpoints of the range.

In one embodiment of the invention, from about 1% to about 100% of the filler base material particles to be added to the coating composition are emeraldine base composite particles. The weight percentage of base material that is an emeraldine base composite is represented by one of the following numbers:

1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 41; 42; 43; 44; 45; 46; 47; 48; 49; 50; 51; 52; 53; 54; 55; 56 5;7 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88 89; 90; 91; 92; 93; 94; 95; 96; 97; 98; 99; and 100.

In another embodiment, the weight percent of the filler base material that is a polyaniline emeraldine base composite is within the range defined by any two numbers from the above list, including the endpoints of the range.

In another embodiment, at least one filler base material is used, which incorporates emeraldine base composite particles. If more than one filler base material us used, at least one filler base material is emeraldine base composite.

All references cited in this disclosure are incorporated by reference in their entirety.

EXPERIMENTAL

Example 1: Preparation of Emeraldine Base-TiO$_2$ Composite

In a beaker, 16 ml aniline or an aniline derivative (99+%, Alfa Aesar) was added to 800 ml of 1M HCl (1M HCl was prepared by dilution of conc. HCl; 36.5-38%, VWR) with stirring. 200 g TiO$_2$ (Ti-Pure® R-706, Chemours) was slowly added to the aniline/HCl solution and stirred for 30 min to make it homogenous. In another beaker, 18.4 g ammonium peroxydisulfate (98.5%, Alfa Aesar) was dissolved in 100 ml 1M HCl. The ammonium peroxydisulfate solution was gradually added to the aniline/TiO$_2$ mixture and the reaction was allowed to stir for 3 hours. The reaction mixture gradually turned green indicating the formation of polyaniline on the TiO$_2$ surface. The mixture was filtered after 3 hours, washed with copious amounts of water and re-dispersed in 2,000 ml of 0.3 M ammonium hydroxide (28% NH$_3$ in water, Alfa Aesar) and stirred for 24 hours to de-dope or remove excess polyaniline. The product turned blue indicating de-doping of polyaniline and formation of insulating emeraldine base-filler composite also referred to as polyaniline emeraldine base composite. Conducting form of polyaniline is green in color whereas the insulating form of polyaniline is blue in color and therefore the reversible process of conversion between conducting and insulating form of polyaniline is indicated by color change from green to blue and vice versa. The product was filtered, washed with deionized (DI) water and dried in oven at 60° C. for 24 hours.

Example 2: Preparation of Emeraldine Base-Talc Composite

In a beaker, 16 ml aniline or aniline derivatives (99+%, Alfa Aesar) was added to 800 ml of 0.2 M p-toluene sulfonic acid (PTSA) solution. The PTSA solution was prepared as 0.2M PTSA solution by dissolving 30 g PTSA monohydrate; Alfa Aesar; in 800 ml deionized water. Talc was slowly added (200 g talc; Imerys) to the aniline/PTSA solution and stirred for 30 min to make it homogenous. In another beaker, 18.4 g ammonium peroxydisulfate (98.5%; Alfa Aesar) was dissolved in 100 ml of 0.2 M PTSA solution. The ammonium peroxydisulfate solution was gradually added to the aniline/talc mixture and the reaction was allowed to stir for 3 hours. The reaction mixture slowly turned green indicating the formation of polyaniline on the talc surface. The mixture was filtered after 3 hours, washed with copious amounts of water and re-dispersed in 2,000 ml of 0.3 M ammonium hydroxide (28% NH$_3$ in water, Alfa Aesar) and stirred for 24 hours to de-dope. The product turned blue indicating de-doping of polyaniline and formation of insulating emeraldine base-talc composite also referred to as polyaniline emeraldine base composite. The product was filtered, washed with DI water and dried in oven at 60° C. for 24 hours.

Example 3: Preparation of Emeraldine Base Composite with Other Base Materials A procedure similar to Examples 1 and 2 was used to make emeraldine base composite with base materials Kaolin, Mica, Clay, BaSO$_4$, etc.

Example 4: Preparation of Aqueous Dispersion of TiO$_2$ Based Emeraldine Base Composite This dispersion was prepared using a high-speed disperser with a cowles dispersion blade impeller. In a plastic container, 21.75 g Disperbyk 2081 wetting and dispersing agent and 0.75 g defoamer were dissolved in 53 g DI water with low speed stirring (~1000 RPM). TiO$_2$ based emeraldine base composite, 225 g, synthesized using procedure described in Example 1 was gradually added to water mixture in plastic container with stirring (~1,500 RPM). After complete addition of emeraldine base composite, the stirring speed was increased to ~6,000 RPM and the mixture was stirred for 20 min. After 20 min, the stirring was stopped and the dispersion was transferred to a glass container.

TABLE 1

| Material Name | Quantity | Function | Supplier |
| --- | --- | --- | --- |
| TiO$_2$ based emeraldine base composite | 225 g | Anticorrosive pigment additive and filler material | Synthesized using above procedure-Example 1 |
| Disperbyk 2081 | 21.75 g | Additive-wetting and dispersing agent | BYK |
| BYK 1710 | 0.75 g | Additive-Defoamer | BYK |
| Water | 53 g | Solvent | |

Example 5: Preparation of Aqueous Dispersion of TiO$_2$- and Talc-Based Emeraldine Base Composite This dispersion was prepared using a high-speed disperser with a cowles dispersion blade-impeller. In a plastic container, 21.75 g Disperbyk 2081 wetting and dispersing agent and 0.75 g defoamer were dissolved in 53 g DI water with low speed stirring (~1,000 RPM). TiO$_2$ based emeraldine base composite, 1.50 g and talc-based emeraldine base composite, 75 g, synthesized using procedure described in Example 1 and Example 2 was gradually added to water mixture in plastic container with stirring (~1,500 RPM). After complete addition of emeraldine base composite, the stirring speed was increased to ~6,000 RPM and the mixture was stirred for 20 min. After 20 min, the stirring was stopped and the dispersion was transferred to a glass container.

TABLE 2

| Material Name | Quantity | Function | Supplier |
| --- | --- | --- | --- |
| TiO$_2$ based emeraldine base composite | 150 g | Anticorrosive pigment additive and filler material | Synthesized using procedure discussed in Example 1 |
| Talc-based emeraldine base composite | 75 g | Anticorrosive pigment additive and filler material | Synthesized using procedure discussed in Example 2 |
| Disperbyk 2081 | 21.75 g | Additive-wetting and dispersing agent | BYK |

TABLE 2-continued

| Material Name | Quantity | Function | Supplier |
|---|---|---|---|
| BYK 1710 | 0.75 g | Additive-defoamer | BYK |
| Water | 53 g | Solvent | |

Example 6: Preparation of Acrylic Anticorrosive Coatings Containing Titanium Dioxide Based Emeraldine Base Composite Powder as an Anticorrosive Pigment Additive and Filler This coating was prepared using a high-speed disperser with a cowles dispersion blade-impeller. In a plastic container, 5 g Disperbyk 2012 wetting and dispersing agent and 0.5 g Byk 1.710 defoamer were dissolved in 70 g DI water with low speed stirring (~1,000 RPM). Avanse MV 100 resin (Dow Chemicals), 280 g was added to the water mixture with stirring followed by slow addition of 0.5 g Additol VXW 6360 viscosity modifier and 70 g $TiO_2$ based emeraldine base composite synthesized using procedure discussed in Example 1. After complete addition of emeraldine base composite, the stirring speed was increased to ~6,000 RPM and the mixture was stirred for 20 min. After 20 min, the stirring was stopped and 1.2 g Dowanol was added to coating mixture and stirred for 20 min at low speed (~2,000 rpm). The stirring was then stopped and the dispersion was transferred to a glass container.

TABLE 3

| Material Name | Quantity | Function | Supplier |
|---|---|---|---|
| $TiO_2$ based emeraldine base composite | 70 g | Anticorrosive pigment additive | Synthesized using procedure discussed in Example 1 |
| Disperbyk 2012 | 5 g | Additive-Dispersing agent | BYK |
| BYK 1710 | 0.5 g | Additive-Defoamer | BYK |
| Water | 70 g | Solvent | |
| Avanse ® MV100 resin | 280 g | Acrylic resin | Dow Chemicals |
| Additol VXW 6360 | 0.5 g | Viscosity Modifier | Allnex |
| Dowanol ® DPM Glycol Ether | 12 g | Film former | Dow Chemicals |

Example 6C: Control Coating Sample

A control sample was prepared similar to the formulation tabulated above in Table 3, except in this case, the base material $TiO_2$ was used instead of emeraldine base composite. The coating obtained was used as a primer to coat cold-roll steel panels from Gardco Co. The size of the steel panels use was 3"×5"×0.032". The steel panels were used as-received. A draw-down applicator blade with 100-μm setting was used to apply the primer coating on to the substrate. The coated panels were dried at ambient temperature for 24 hours.

Figure 1:
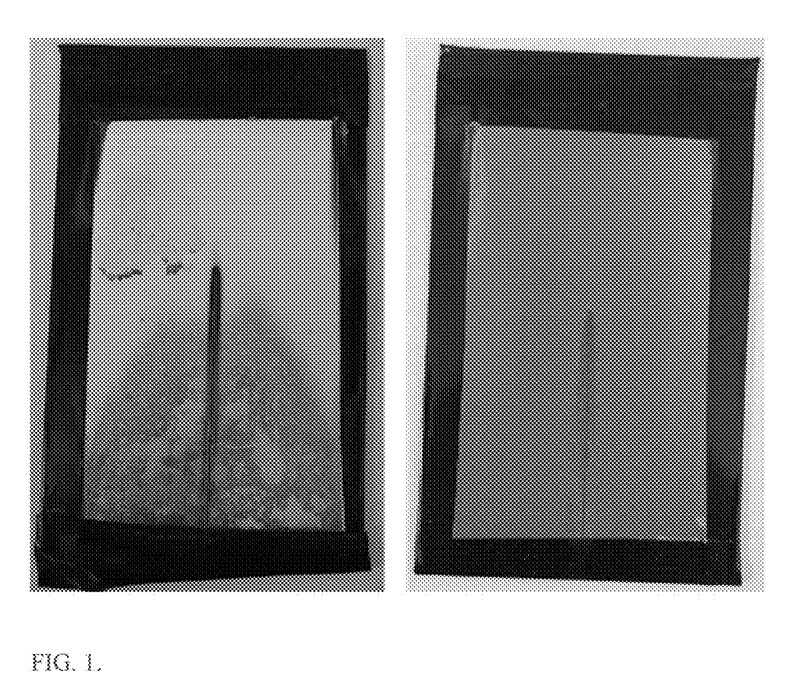
FIG. 1: Digital images of steel panels after immersion in 5 wt. % salt water for 2 weeks. On the left is the digital image of the control sample, which is a steel panel coated with the control coating formulated using acrylic resin, as described in Example 6C. On the right is the digital image of an experimental test sample, which is a steel panel, coated with test sample formulated using acrylic resin and $TiO_2$ based anticorrosive pigment composite, described in Example 6.

FIG. 1 shows digital images of steel panels after immersion in 5 wt. % salt water for 2 weeks. On the left is the digital image of the control sample, which is a steel panel coated with the control coating formulated using acrylic resin, as described in Example 6C. On the right is the digital image of an experimental test sample, which is a steel panel, coated with test sample formulated using acrylic resin and $TiO_2$ based anticorrosive pigment composite, described in Example 6.

Figure 6:
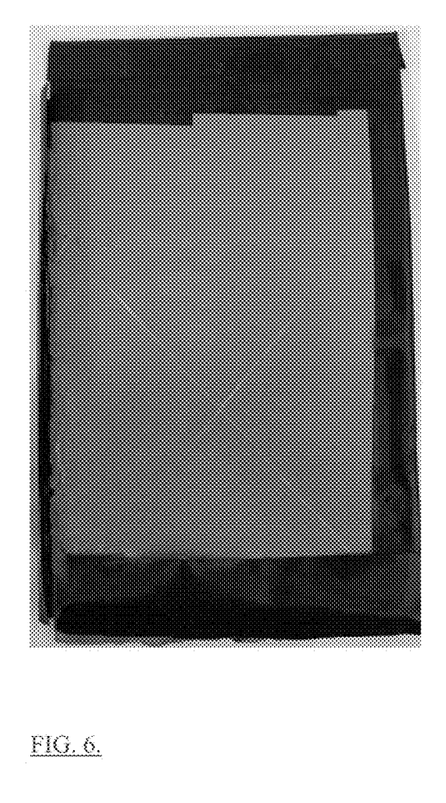
FIG. 6. Digital image of an aluminum panel after immersion in 5 wt. % salt water for 3 months. The aluminum panel was coated with test sample formulated using acrylic resin and $TiO_2$ based anticorrosive pigment composite, described in Example 6.

Also, FIG. 6 shows a digital image of an aluminum panel after immersion in 5 wt. % salt water for 3 months. The aluminum panel was coated with test sample formulated using acrylic resin and $TiO_2$ based anticorrosive pigment composite, described in Example 6.

Example 7: Preparation of Two Component Epoxy Coating Containing Titanium Dioxide Based Emeraldine Base Composite Powder as an Anticorrosive Pigment Additive and Filler Part A This coating was prepared using a high-speed disperser with a cowles dispersion blade-impeller. In a plastic container, 2.4 g Disperbyk 2012 wetting and dispersing agent and 0.24 g Byk 1.710 defoamer were dissolved in 40 g DI water with low speed stirring (~1000 RPM). Aradur 3986 (Huntsman), 25.50 g was added to the water mixture with stirring followed by slow addition of 40 g $TiO_2$ based emeraldine base composite synthesized using procedure discussed in Example 1. After complete addition of emeraldine base composite, the stirring speed was increased to ~6000 RPM and the mixture was stirred for 20 min. After 20 min, the stirring was stopped and the dispersion was transferred to a glass container.

TABLE 4A

| Material Name | Quantity | Function | Supplier |
|---|---|---|---|
| $TiO_2$ based emeraldine base composite | 40 g | Anticorrosive pigment additive | Synthesized using procedure discussed in Example 1 |
| Disperbyk 2012 | 2.4 g | Additive-Dispersing agent | BYK |
| BYK 1710 | 0.24 g | Additive-Defoamer | BYK |
| Water | 40 g | Solvent | |
| Aradur 3986 BD | 25.50 g | Hardener or crosslinker | Huntsman |

Part B

In a plastic container, 78.10 g Araldite was mixed with 40 g DI water.

TABLE 4B

| Material Name | Quantity | Function | Supplier |
|---|---|---|---|
| Araldite PZ3961 | 78.10 g | Binder | Huntsman |
| Water | 40 g | Solvent | |

Part A and Part B were mixed together in 1:1 ratio. After 15 min. of mixing, the mixture was coated on cold-roll steel panels from Gardco Co. The size of the steel panels was 3"×5"×0.032". The steel panels were used as-received. A draw-down applicator blade with 100-μm setting was used to apply the primer coating on the substrate. The coated panels were dried at ambient temperature for 24 hours.

Example 7C: Control Coating Sample

A control sample was prepared similar to the formulation tabulated above except in this case $TiO_2$ was used instead of emeraldine base composite.

Figure 2:
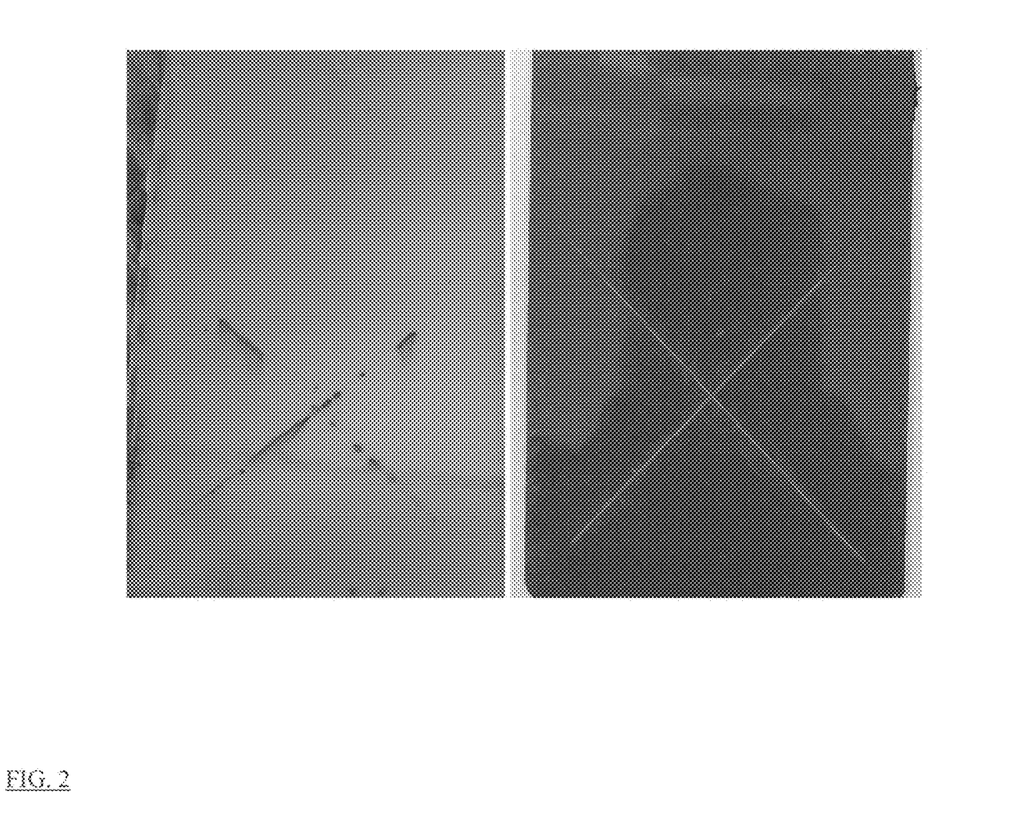
FIG. 2: Digital images of steel panels after immersion in 5 wt. % salt water for 1 week. On the left is the digital image of the control sample, which is a steel panel coated with the control coating formulated using two-component epoxy resin from Example 7C. On the right is the digital image of an experimental test sample, which is a steel panel, coated with test sample formulated using two-component epoxy resin and $TiO_2$ based anticorrosive pigment composite from Example 7.

FIG. 2 shows digital images of steel panels after immersion in 5 wt. % salt water for 1 week. On the left is the digital image of the control sample, which is a steel panel coated with the control coating formulated using two-component epoxy resin from Example 7C. On the right is the digital image of an experimental test sample, which is a steel panel, coated with test sample formulated using two-component epoxy resin and $TiO_2$ based anticorrosive pigment composite from Example 7.

Example 8: Preparation of Acrylic Anticorrosive Coatings Containing Titanium Dioxide and Talc-Based Emeraldine Base Composite Dispersion as an Anticorrosive Pigment Additive and Filler Since this coating was prepared using already dispersed $TiO_2$- and talc-based emeraldine based composite from Example 5, it eliminates the need for high-speed (grinding) dispersion of resin and fillers. The emeraldine base composite dispersion from Example 5 can be simply mixed using a low speed impeller (propeller, turbine, blade etc.) with a resin and coatings can be formulated.

In a plastic container, 76 g $TiO_2$- and talc-based emeraldine base composite dispersion from example 5 was mixed with 100 g Avanse MV 100 resin (Dow Chemicals) and 10 g DI water by a low speed stirring (~1000 rpm) using propeller type impeller. After stirring for couple of hours, 0.1 g Additol VXW 6360 was added for viscosity adjustment and 5 g Dowanol DPM Glycol Ether from Dow Chemicals was added as film forming agent. After ~20 min, the stirring was stopped and the coating was transferred to a glass container.

TABLE 5

| Material Name | Quantity | Function | Supplier |
|---|---|---|---|
| $TiO_2$- and talc-based emeraldine base composite dispersion | 76 g | Anticorrosive pigment additive | Synthesized using procedure discussed in Example 5 |
| Water | 10 g | Solvent | |
| Avanse MV100 resin | 100 g | Acrylic resin | Dow Chemicals |
| Dowanol DPM Glycol Ether | 5 g | Film former | Dow Chemicals |
| Additive VXW 6360 | 0.1 g | Viscosity Modifier | Allnex |

The coating obtained was used as a primer to coat cold-roll steel panels from Gardco Co. The size of the steel panels was 3"×5"×0.032". The steel panels were used as-received. A draw-down applicator blade with 100-μm setting was used to apply the primer coating on the substrate. The coated panels were dried at ambient temperature for 24 hours.

Example 8C: Control Coating Sample

A control sample was prepared similar to the formulation tabulated in Table 5 above except in this case $TiO_2$- and talc-based dispersion was used instead of emeraldine base composite dispersion.

Figure 3:
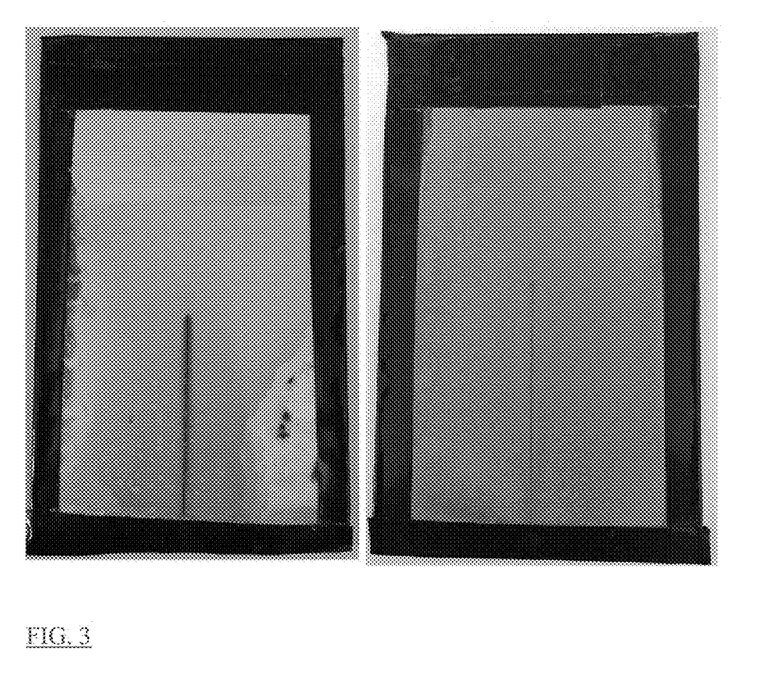
FIG. 3: Digital images of steel panels after immersion in 5 wt. % salt water for 2 weeks. On the left is the digital image of the control sample, which is a steel panel coated with the control coating formulated using acrylic resin from Example 8C. On the right is the digital image of an experimental test sample, which is a steel panel, coated with test sample formulated using acrylic resin and $TiO_2$- and talc-based anticorrosive pigment composite dispersion from Example 8.

FIG. 3 shows digital images of steel panels after immersion in 5 wt. % salt water for 2 weeks. On the left is the digital image of the control sample, which is a steel panel coated with the control coating formulated using acrylic resin from Example 8C. On the right is the digital image of an experimental test sample, which is a steel panel, coated with test sample formulated using acrylic resin and $TiO_2$- and talc-based anticorrosive pigment composite dispersion from Example 8.

Example 9: Preparation of One-Component Epoxy Anticorrosive Coatings Containing Titanium Dioxide and Talc-Based Emeraldine Base Composite Dispersion as an Anticorrosive Pigment Additive and Filler Since this coating was prepared using already dispersed $TiO_2$- and talc-based emeraldine based composite from example 5, it eliminates the need for high-speed (grinding) dispersion of resin and fillers. The emeraldine base composite dispersion from example 5 can be simply mixed using a low speed impeller (propeller, turbine, blade, etc.) with a resin and coatings can be formulated.

In a plastic container, 76 g $TiO_2$- and Talc-based emeraldine base composite dispersion from example 5 was mixed with 100 g Beckopox EM2120 W (Dow Chemicals) and 10 g DI water by a low speed stirring (~1,000 rpm) using propeller type impeller. After stirring for couple of hours, 0.1 g Additol VXW 6360 was added for viscosity adjustment and 5 g Dowanol DPM Glycol Ether from Dow Chemicals was added as film forming agent. After ~20 min, the stirring was stopped and the coating was transferred to a glass container.

TABLE 6

| Material Name | Quantity | Function | Supplier |
|---|---|---|---|
| $TiO_2$- and talc-based emeraldine base composite dispersion | 76 g | Anticorrosive pigment additive | Synthesized using procedure discussed in Example 5 |
| Water | 10 g | Solvent | |
| Beckopox EM2120 W | 100 g | 1K Epoxy resin | Allnex |
| Dowanol DPM Glycol Ether | 5 g | Film former | Dow chemicals |
| Additol VXW 6360 | 0.1 g | Viscosity Modifier | Allnex |

The coating obtained was used as a primer to coat cold-roll steel panels from Gardco Co. The size of the steel panels was 3"×5"×0.032". The steel panels were used as-received. A draw-down applicator blade with 100-μm setting was used to apply the primer coating on the substrate. The coated panels were dried at ambient temperature for 24 hours.

Example 9C: Control Coating Sample

A control sample was prepared similar to the formulation tabulated in Table 7 above, except in this case, $TiO_2$- and Talc-based dispersion (prepared similar to Example 5) was used instead of emeraldine base composite dispersion.

Figure 4:
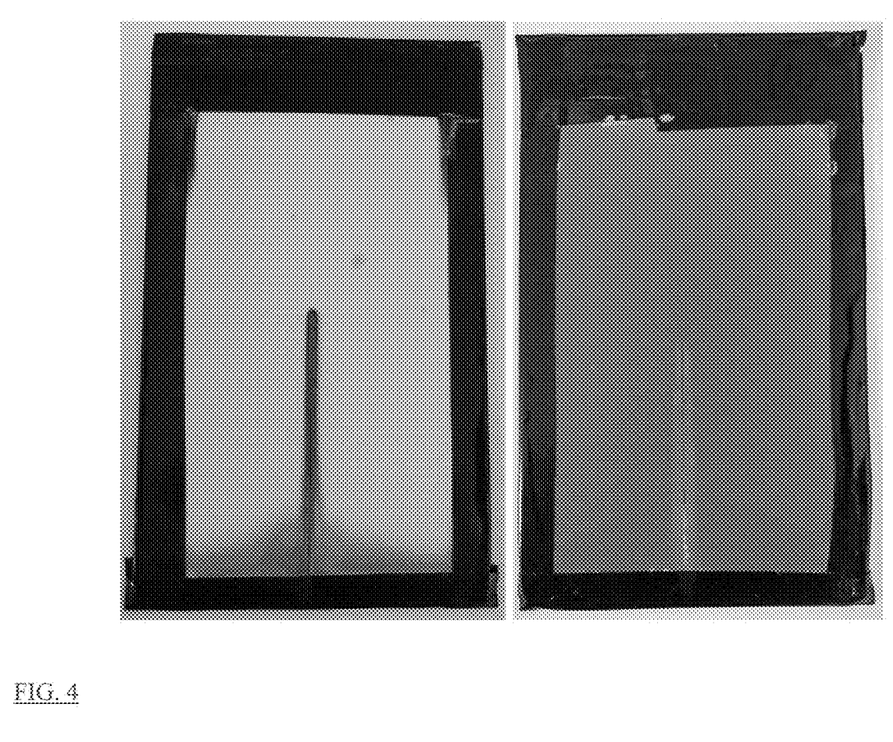
FIG. 4: Digital images of steel panels after immersion in 5 wt. % salt water for 2 weeks. On the left is the digital image of the control sample, which is a steel panel coated with the control coating formulated using the one-component epoxy resin from Example 9C. On the right is the digital image of an experimental test sample, which is a steel panel coated with test sample formulated using the one-component epoxy resin and $TiO_2$- and talc-based anticorrosive pigment composite dispersion from Example 9.

FIG. 4 shows digital images of steel panels after immersion in 5 wt. % salt water for 2 weeks. On the left is the digital image of the control sample, which is a steel panel coated with the control coating formulated using the one-component epoxy resin from Example 9C. On the right is the digital image of an experimental test sample, which is a steel panel coated with test sample formulated using the one-component epoxy resin and $TiO_2$- and talc-based anticorrosive pigment composite dispersion from Example 9.

Example 10: Preparation of Two-Component Epoxy Coating Containing Titanium Dioxide and Talc-Based Emeraldine Base Composite Dispersion as an Anticorrosive Pigment Additive and Filler Since this coating was prepared using already dispersed $TiO_2$- and Talc-based emeraldine based composite from Example 5, it eliminates the need for high-speed (grinding)

dispersion of resin and fillers. The emeraldine base composite dispersion from Example 5 can be simply mixed using a low speed impeller (propeller, turbine, blade, etc.) with a resin and coatings can be formulated.

Part A

In a plastic container, 2 g Tego Dipsers 757W (Evonik) wetting and dispersing agent, 0.24 g Tego Foamex 1488 (Evonik) defoamer and 5 g Byk 4513 (Byk) were mixed with 50 g Aradur 3986 (Huntsman) with stirring. 100 g $TiO_2$- and talc-based emeraldine base composite dispersion from example 5 was added to resin with low speed stirring (~1,000 rpm) using propeller type impeller. After 2 hours, the stirring was stopped and the mixture was stored in a glass container.

TABLE 7A

| Material Name | Quantity | Function | Supplier |
| --- | --- | --- | --- |
| $TiO_2$- and talc-based emeraldine base composite dispersion | 100 g | Anticorrosive pigment additive | Synthesized using procedure discussed in example 1 |
| Byk 4513 | 5 g | Additive-adhesion promoter | BYK |
| Tego Foamex 1488 | 0.24 g | Additive-Defoamer | Evonik |
| Tego Dispers 757W | 2 g | Additive-dispersing agent | Evonik |
| Aradur 3986 BD | 50 g | Hardener or crosslinker | Huntsman |

TABLE 7B

| Material Name | Quantity | Function | Supplier |
| --- | --- | --- | --- |
| Araldite PZ3961 | 100 g | Binder | Huntsman |

Components from Table 8A and 8B were mixed together in 1:1 ratio. After 15 min. of mixing, the mixture was coated on cold-roll steel panels from Gardco Co. The size of the steel panels was 3"×5"×0.032". The steel panels were used as-received. A draw-down applicator blade with 100-µm setting was used to apply the primer coating on the substrate. The coated panels were dried at ambient temperature for 24 hours.

Example 10C: Control Coating Sample

A control sample was prepared similar to the formulation tabulated in Tables 8A and 8B above, except, in this case, $TiO_2$- and talc-based dispersion (prepared similarly to Example 5) was used instead of emeraldine base composite dispersion.

Figure 5:
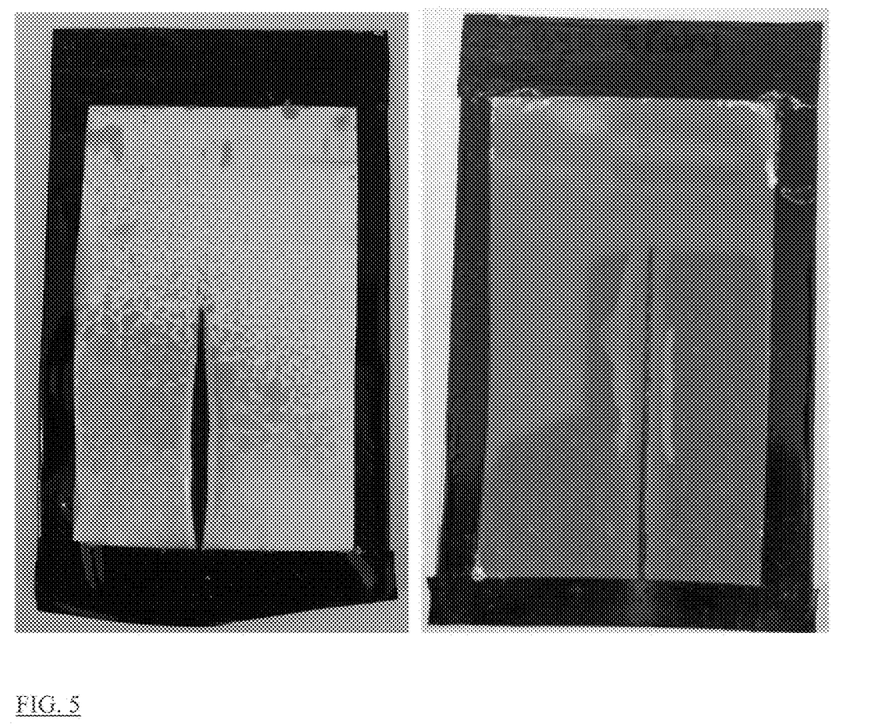
FIG. 5: Digital images of steel panels after immersion in 5 wt. % salt water for 4 weeks. (On the left is the digital image of the control sample, which is a steel panel coated with the control coating formulated using a two-component epoxy resin from Example 10C. On the right is the digital image of an experimental test sample, which is a steel panel coated with test sample formulated using the two-component epoxy resin and $TiO_2$- and talc-based anticorrosive pigment composite dispersion from Example 10.

FIG. 5 shows digital images of steel panels after immersion in 5 wt. % salt water for 4 weeks. (On the left is the digital image of the control sample, which is a steel panel coated with the control coating formulated using a two-component epoxy resin from Example 10C. On the right is the digital image of an experimental test sample, which is a steel panel coated with test sample formulated using the two-component epoxy resin and $TiO_2$- and talc-based anticorrosive pigment composite dispersion from Example 10.

Example 11: Preparation of Long Oil Alkyd Based Anticorrosive Coatings Containing Titanium Dioxide Based Emeraldine Base Composite Powder as an Anticorrosive Pigment Additive and Filler This coating was prepared using a high-speed disperser with a cowles dispersion blade-impeller. In a steel container, 15 g mineral spirit and 0.83 g Bentone SD were mixed using a disperser accompanied with mild stirring. To the steel container, 55 g of EPS 6603 long oil alkyd resin from EPS Materials was added with stirring of the mixture for 15 min. To this mixture, 30 g of emeraldine base-$TiO_2$ composite—synthesized using procedure discussed in Example 1—was added, with stirring. After complete addition of emeraldine base composite, the stirring speed was increased to ~6,000 RPM and the mixture was stirred for 25 min. After 25 min, the stirring was stopped and the dispersion was transferred to a glass container.

TABLE 8

| Material Name | Quantity | Function | Supplier |
| --- | --- | --- | --- |
| $TiO_2$ based emeraldine base composite | 30 g | Anticorrosive pigment additive | Synthesized using procedure discussed in Example 1 |
| Mineral Spirit | 15 g | Solvent | Walmart |
| Bentone SD 2 | 0.83 g | Viscosity modifier | |
| EPS 6603 | 55 g | Long oil alkyd resin | EPS Materials |

Example 12: Preparation of Poly-o-Toluidine Emeraldine Base-$TiO_2$ Composite

Emeraldine base form of poly-o-toluidine was synthesized according to previously published procedure with slight modification (Surwade et al., Synth. Met. 159, 2009, 21.56). Briefly, 10 ml o-toluidine (Alfa Aesar) was dissolved in 1.50 ml 1M Hydrochloric acid (HCl) in a glass beaker. In another beaker, 5.75 g ammonium peroxydisulfate (Alfa Aesar) was dissolved in 100 ml 1M HCl. The ammonium peroxydisulfate solution was then added to o-toluidine beaker and the reaction mixture was stirred for 3 hours. The mixture was filtered, washed with acetonitrile and then the green colored poly-o-toluidine emeraldine salt product was stirred in 2,000 mL 0.2 M ammonium hydroxide for 12 hours. The product turned into blue color indicating conversion of emeraldine salt to emeraldine base. The product was filtered, washed with acetonitrile and dried in oven at 60° C. for 72 hours.

The dried emeraldine base powder, 4 g, was dissolved in 50 ml chloroform. To this solution, 20 g $TiO_2$ (Ti Pure® R-706, Chemours) was added, with stirring. The chloroform was evaporated under vacuum and stirring resulting in deposition of poly-o-toluidine emeraldine base on the $TiO_2$ surface.

Similar procedure could be used for deposition of polyaniline or its derivatives on variety of base materials by dissolving the emeraldine base in appropriate solvent and then evaporating the solvent in presence of the base material such that emeraldine base adheres to the base material.

The invention claimed is:

1. An emeraldine base composite, said emeraldine base composite comprising:
   (a) an emeraldine base, wherein said emeraldine base is substituted or unsubstituted polyaniline; and
   (b) at least one base material, wherein said emeraldine base covers the entire surface of said at least one base material, and wherein the weight of said emeraldine base as percent of said emeraldine base composite is in the range of from about 0.1% to about 50%;
   wherein said emeraldine base is deposited on the at least one base material as a result of polymerization.

2. The emeraldine base composite of claim 1, wherein said at least one base material is an inorganic material or an organic material;
    wherein aid inorganic base material is selected from the group consisting of talc, $TiO_2$, mica, kaopaque, clay, kaolin, barium sulfate, alumina, silica, zeolite, alumina-silica, calcium borosilicate, phosphosilicates, molybdate pigments, barium metaborate, zinc phosphate, quartz, montmorillonite, mixtures thereof, and combinations thereof, and wherein said organic base material is selected from the group consisting of synthetic rubber, phenol-formaldehyde resin, neoprene, nylon, polyvinyl chloride, polystyrene, polyethylene, polypropylene, polyacrylonitrile, PVB, silicone, combinations thereof, and mixtures thereof.

3. A corrosion-inhibiting additive comprising the emeraldine base composite as recited in claim 1.

4. An aqueous dispersion, comprising:
    (a) a corrosion inhibiting additive comprising emeraldine base composite as recited in claim 1;
    (b) a wetting agent and/or a dispersing agent; and
    (c) a water.

5. An anti-corrosive coating composition comprising the corrosion-inhibiting additive as recited in claim 3.

6. The anti-corrosive coating composition of claim 5, wherein said anti-corrosive coating composition is aqueous-based or solvent-based.

7. The anti-corrosive coating composition of claim 5, wherein the emeraldine base composite is added to the coating as powder during the grinding or let-down stage or as aqueous dispersion during the grinding or let down stage.

8. A process for making an emeraldine base composite comprising:
    (1) providing the monomer of an emeraldine base, wherein said emeraldine base is substituted or unsubstituted polyaniline;
    (2) providing at least one base material;
    (3) contacting said emeraldine base monomer with said base material;
    (4) polymerizing said emeraldine base monomer on said base material; and
    (5) de-doping said emeraldine base to form a contiguous coating of insulated form of polyaniline on said base material to form the emeraldine base composite.

9. A composite particle comprising:
    (a) an emeraldine base;
    (b) a doped conducting polyaniline; and
    (c) at least one base material, wherein said emeraldine base and said doped conducting polyaniline covers the entire surface of said at least one base material, and wherein the weight of said emeraldine base and said doped conducting polyaniline as percent of said composite is in the range of from about 0.1% to about 50% wherein said emeraldine base is deposited on the at least one base material as a result of polymerization.

10. The composite particle of claim 9, wherein said at least one base material is an inorganic material or an organic material;
    wherein said inorganic base material is selected from the group consisting of talc, $TiO_2$, mica, kaopaque, clay, kaolin, barium sulfate, alumina, silica, zeolite, alumina-silica, calcium borosilicate, phosphosilicates, molybdate pigments, barium metaborate, zinc phosphate, quartz, montmorillonite, mixtures thereof, and combinations thereof; and
    wherein said organic base material is selected from the group consisting of synthetic rubber, phenol-formaldehyde resin, neoprene, nylon, polyvinyl chloride, polystyrene, polyethylene, polypropylene, polyacrylonitrile, PVB, silicone, combinations thereof, and mixtures thereof.

11. A corrosion-inhibiting additive comprising the composite particle as recited in claim 9.

12. An aqueous dispersion, comprising:
    (a) a corrosion-inhibiting additive comprising the composite particle as recited in claim 9;
    (b) a wetting agent and/or a dispersing agent; and
    (c) water.

13. An anti-corrosive coating composition comprising the corrosion-inhibiting additive as recited in claim 11.

14. The anti-corrosive coating composition of claim 13, wherein said anti-corrosive coating composition is aqueous-based or solvent-based.

15. The anti-corrosive coating composition of claim 13, wherein the composite particle is added to the coating as powder during the grinding or let-down stage or as aqueous dispersion during the grinding or let down stage.

16. A process for making a composite particle of claim 9, comprising:
    (1) providing the monomer of the emeraldine base and doped conducting polyaniline;
    (2) providing at least one base material;
    (3) contacting said monomer of emeraldine base and said doped conducting polyaniline with said base material;
    (4) polymerizing the monomer of said emeraldine base and said doped conducting polyaniline on said base material; and
    (5) de-doping said emeraldine base to form a contiguous or non-contiguous coating of insulated form of polyaniline and doped polyaniline on said base material to form the composite particle.

* * * * *